United States Patent
Kajino (10) Patent No.: US 6,972,837 B2
(45) Date of Patent: Dec. 6, 2005

(54) LENS METER

(75) Inventor: Tadashi Kajino, Okazaki (JP)

(73) Assignee: Nidek Co., Ltd., Gamagori (JP)

( * ) Notice: Subject to any disclaimer, the term of this patent is extended or adjusted under 35 U.S.C. 154(b) by 0 days.

(21) Appl. No.: 10/230,330

(22) Filed: Aug. 29, 2002

(65) Prior Publication Data

US 2003/0043367 A1    Mar. 6, 2003

(30) Foreign Application Priority Data

Sep. 4, 2001    (JP) ............................ 2001-267745

(51) Int. Cl.[7] .............................................. G01B 9/00
(52) U.S. Cl. ...................................................... 356/124
(58) Field of Search ................................. 356/124–128

(56) References Cited

U.S. PATENT DOCUMENTS

| | | | |
|---|---|---|---|
| 3,880,525 A | 4/1975 | Johnson | |
| 5,303,022 A | 4/1994 | Humphrey et al. | |
| 5,682,234 A | 10/1997 | Kajino | |
| 5,734,465 A | 3/1998 | Kajino | |
| 6,061,123 A | * 5/2000 | Ikezawa et al. | ............. 356/124 |

FOREIGN PATENT DOCUMENTS

JP     A 2001-124662     5/2001

* cited by examiner

*Primary Examiner*—Zandra V. Smith
*Assistant Examiner*—Amanda Merlino
(74) *Attorney, Agent, or Firm*—Oliff & Berridge, PLC (57) ABSTRACT

A lens meter for measuring optical characteristics of a lens, which is capable of measuring a progressive lens easily and an aspherical lens accurately. The lens meter is provided with a lens rest having an aperture, for placing a lens thereon, a measurement optical system having a light source which projects a measurement light bundle onto the lens placed on the lens rest and a photodetector which receives the measurement light bundle transmitted through the lens, for forming a plurality of different measuring positions inside the aperture, calculation means for obtaining optical characteristics at each of the measuring positions based on an output from the photodetector, comparison means for comparing the optical characteristics obtained at the measuring positions, and guiding means for guiding a predetermined one of the measuring positions to at least one of a near viewing section and a far viewing section of a progressive lens based on a result of the comparison.

3 Claims, 5 Drawing Sheets

LENS METER

BACKGROUND OF THE INVENTION

1. Field of the Invention

The present invention relates to a lens meter for measuring optical characteristics of a lens for an eye such as a spectacle lens.

2. Description of Related Art

A lens meter is known which projects a measurement light bundle onto a lens and detects the measurement light bundle transmitted through the lens using a photodetector, then obtains optical characteristics of the lens based on the detected results. Conventionally, this kind of lens meter is arranged to place a lens on a nosepiece, and to measure a refractive power of the part of the lens positioned at an approximate center of the nosepiece using a group of measurement light bundles (at least three light bundles located on the same circumference of a circle) as is stated in Japanese Patent Application Unexamined Publication No. Hei 09-43099 (U.S. Pat. No. 5,682,234).

When measuring a progressive focal lens (hereinafter referred to as a progressive lens) using such a lens meter, it is necessary to move the lens on a nosepiece to find an optimum measuring point of the far viewing section and that of the near viewing section.

As for single focal lenses, aspherical lenses have become dominant, and such a lens has the curvature of a lens curve and the amount of aberration both of which vary with distance from the optical center. Accordingly, it is desired that more accurate measurement results be obtained.

SUMMARY OF THE INVENTION

An object of the present invention is to overcome the above-described problems and to provide a lens meter capable of measuring a progressive lens easily and an aspherical lens accurately.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the present invention, as embodied and broadly described herein, a lens meter for measuring optical characteristics of a lens is provided with a lens rest having an aperture, for placing a lens thereon, a measurement optical system having a light source which projects a measurement light bundle onto the lens placed on the lens rest and a photodetector which receives the measurement light bundle transmitted through the lens, for forming a plurality of different measuring positions inside the aperture, calculation means for obtaining optical characteristics at each of the measuring positions based on an output from the photodetector, comparison means for comparing the optical characteristics obtained at the measuring positions, and guiding means for guiding a predetermined one of the measuring positions to at least one of a near viewing section and a far viewing section of a progressive lens based on a result of the comparison.

In another aspect of the present invention, a lens meter for measuring optical characteristics of a lens is provided with a lens rest having an aperture, for placing a lens thereon, a measurement optical system having a light source which projects a measurement light bundle onto the lens placed on the lens rest and a photodetector which receives the measurement light bundle transmitted through the lens, for forming a plurality of different measuring positions inside the aperture, calculation means for obtaining optical characteristics at each of the measuring positions based on an output from the photodetector, and averaging means for averaging the optical characteristics obtained at the measuring positions.

Yet, in another aspect of the present invention, a lens meter for measuring optical characteristics of a lens is provided with a lens rest having an aperture, for placing a lens thereon, a measurement optical system having a light source which projects a measurement light bundle onto the lens placed on the lens rest and a photodetector which receives the measurement light bundle transmitted through the lens, for forming a plurality of different measuring positions inside the aperture, calculation means for obtaining optical characteristics at each of the measuring positions based on an output from the photodetector, and judgment means for judging whether the lens is a single focal lens or a progressive focal lens based on the optical characteristics obtained at the measuring positions.

BRIEF DESCRIPTION OF THE DRAWINGS

The accompanying drawings, which are incorporated in and constitute a part of this specification, illustrate embodiments of the present invention and, together with the description, serve to explain the objects, advantages and principles of the invention. In the drawings.

DETAILED DESCRIPTION OF THE PREFERRED EMBODIMENTS

Figure 1:
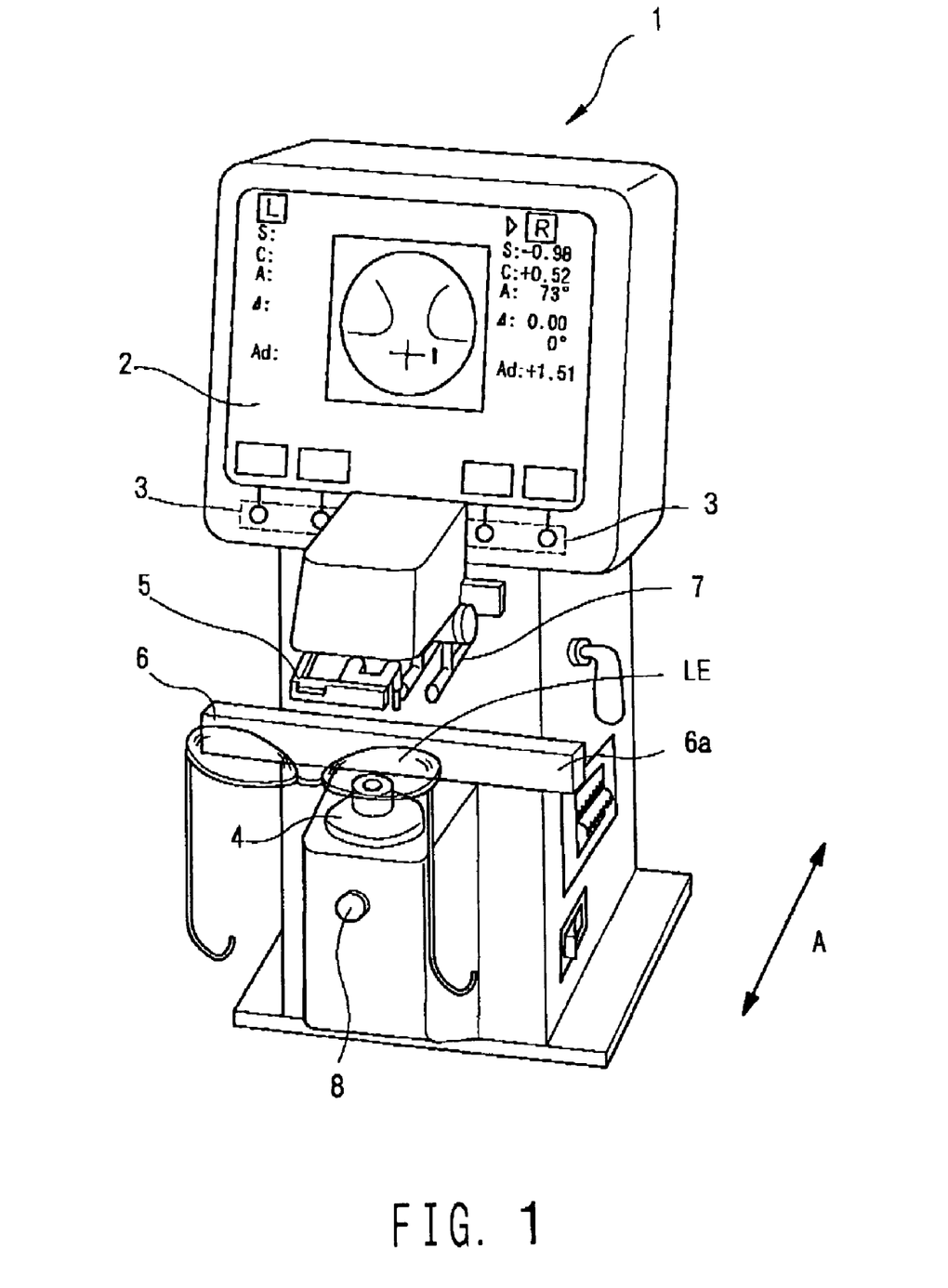
FIG. 1 is a schematic external view of a lens meter of the present preferred embodiment.

A detailed description of one preferred embodiment of a lens meter embodying the present invention will now be given referring to the accompanying drawings. FIG. 1 is a schematic external view of a lens meter of the preferred embodiment.

Reference numeral 1 indicates a main body of a lens meter. A display 2 is composed of an LCD and the like, and displays information necessary for a measurement, including a target mark for alignment, and measurement results. Switches 3 are used for input. One of them, which corresponds to a switch display on the display 2, is pushed to give necessary instructions for input, such as selection of a measurement mode. A nosepiece (lens rest) 4 is for placing a lens LE to be measured thereon, and serves as a reference point at the time of measurement. A lens holder 5 is lowered (toward the nosepiece 4) for stably holding the lens LE placed on the nosepiece 4.

A lens table (a frame table) 6 is movable in the back-and-forth direction (the direction of an arrow A in FIG. 1). When the lens LE in a frame is to be measured, the lens table 6 is brought into contact with the bottom ends (the bottom ends under a condition of wearing spectacles) of the right and left lenses (or the right and left lens frames), thereby stabilizing the lens LE. Consequently, the astigmatic axial angle of the lens LE may be measured accurately. A marking mechanism 7 is used for making a mark on the lens LE. A switch 8 is for storing data about the optical characteristics of the lens LE, When the switch 8 is pushed, a measurement result is displayed on the display 2, and is stored into a memory 41 (described later) inside the body 1.

Figure 2:
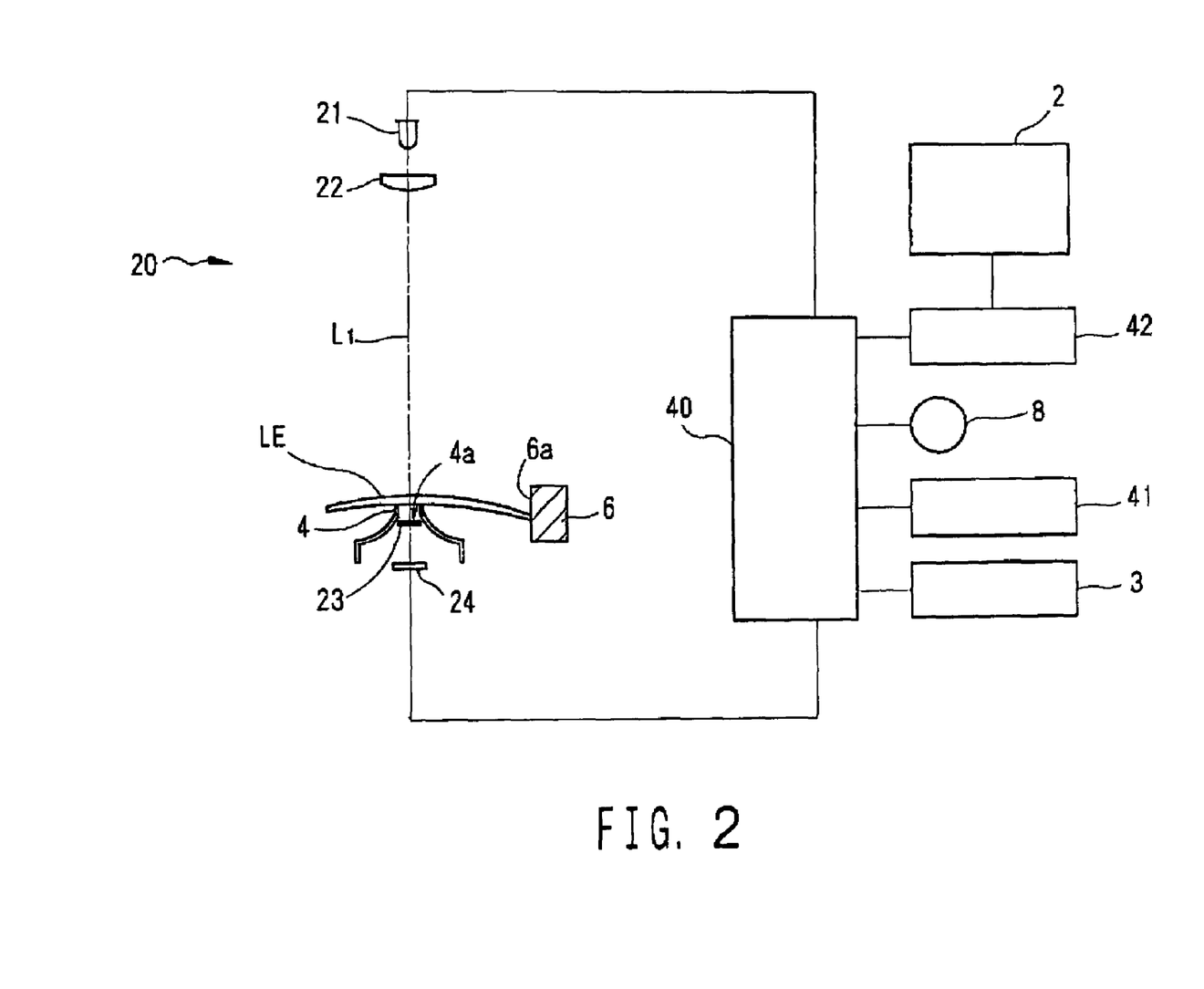
FIG. 2 is a view of schematic configurations of an optical system and a control system of the present lens meter.

FIG. 2 shows schematic configurations of an optical system and a control system of the present lens meter. The optical system is shown from the right side when the main body 1 of the lens meter is viewed from the front. Reference numeral 20 indicates a measurement optical system, and L1 is a measurement optical axis thereof. The measurement optical system 20 is provided with a measurement light source 21 such as an LED, a collimating lens 22, a grid target plate 23 with measurement targets formed thereon, and a two-dimensional image sensor 24, all of which are disposed on the optical axis L1. The optical axis L1 passes through the approximate center of an aperture 4a of the nosepiece 4, and is arranged approximately perpendicular to an opening plane of the aperture 4a. The target plate 23 is placed in the vicinity of the aperture 4a. The distance between the image sensor 24 and the top end of the nosepiece 4 (the back vertex of the lens LE) is designed to be smaller than the minimum focal length within a measurement region of the lens LE.

Figure 3:
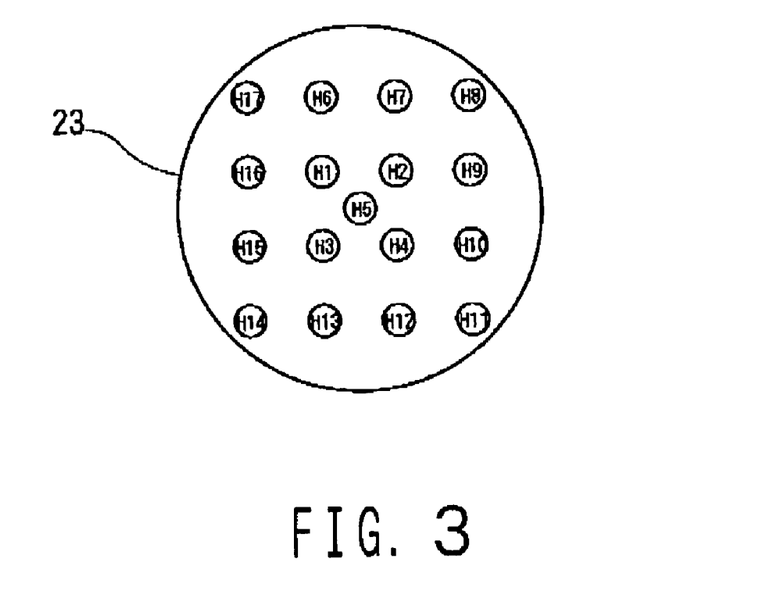
FIG. 3 is a view showing a pattern formed on a grid target plate.

FIG. 3 shows a pattern of the measurement targets on the target plate 23. The external diameter of the target plate 23 is $\phi 8$ mm which is approximately equal to the internal diameter of the aperture 4a, and seventeen holes H1 to H17 of $\phi 0.2$ mm in diameter are formed in the target plate 23. The holes other than the central hole H5 are spaced uniformly with a pitch of 1.8 mm. The central hole H5 is in the middle of the target plate 23 so as to be disposed on the optical axis L1, and is used for checking the position of each hole and for measuring a prism. The measurement region formed by the group of the holes H1 to H4 is confined within a size appropriate to measure a contact lens as well. (At the time of measurement of a contact lens, the aperture 4a is made to be smaller, or the nosepiece 4 is replaced with another one having a smaller aperture.) A measurement light bundle from the light source 21 is formed into a parallel light bundle by the collimating lens 22, and is projected onto the lens LE. The light bundle is transmitted through the lens LE, and part of the light bundle having passed through the aperture 4a and each hole in the target plate 23 enters the image sensor 24.

Signals outputted from the image sensor 24 are inputted into a control unit 40. The position of the image of each hole has been displaced due to a refractive power of the lens LE placed on the nosepiece 4. Based on the displacement of the image of each hole from the position of the same image reaching the image sensor 24 without the lens LE placed on the nosepiece 4, the control unit 40 calculates the optical characteristics (a spherical power, a cylindrical power, an astigmatic axial angle, and an amount of prism) of the lens LE. For example, when the optical center of a lens having only a spherical power is aligned over the center of four holes (e.g. H1 to H4), the images of the four holes scale up or down uniformly in an annular (circular) shape from the center of their positions determined when the lens is not placed. And, the spherical power may be obtained based on the amount of this scale-up or down. In addition, when the axis of a lens having only a cylindrical power is placed at the center of the four holes (e.g. H1 to H4), the images of the four holes scale up or down in an oval shape from the center of their positions determined when the lens is not placed. Then, the cylindrical power may be obtained based on the amount of this scale-up or down. Further, the astigmatic axial angle maybe obtained from the axial direction of the oval shape. Furthermore, the amount of prism may be obtained from the amount of translation of the center of the images of the four holes. The lens having the spherical power, the cylindrical power, the amount of prism and the like may be considered as a combination of these cases (see Japanese Patent Application Unexamined Publication SHO50-145249).

Incidentally, if the target plate 23 has four (at least three) holes disposed on concentric circles in the approximate center of the aperture 4a, optical characteristics necessitated are usually obtained The target plate 23 of the present lens meter, however, has similar holes H6 to H17 on the periphery of the four holes H1 to H4 in the center, and the optical characteristics are obtained for each group of any four (at least three) adjoining holes of the holes H1 to H17 except the central hole H5. Considering the four (at least three) adjoining holes as one group, different measuring positions are formed inside the aperture 4a, and optical characteristics at each measuring position are obtained. That is to say, in this embodiment, optical characteristics are obtained at a total of nine measuring positions corresponding to nine groups of the holes H1 to H4, the holes H3, H4, H12 and H13, the holes H1, H2, H6 and H7, the holes H2, 4, 9 and 10, the holes 2, 7, 8 and 9, the holes H4, H10, H11 and H12, the holes H1, H3, H15 and H16, the holes H1, H6, H16 and H17, and the holes H3, H13, H14, H15.

Owing to such arrangement of the holes (targets) through which the measurement light bundle passes, in the case of measuring a progressive lens, optical characteristics of the lens LE at plural measuring positions inside the aperture 4a may be obtained, and whether the present measuring position is in the far viewing section or not is efficiently judged. Similarly, for measuring the near viewing section, whether the present measuring position is in the near viewing section or not may be efficiently judged.

Incidentally, the target plate 23 may be disposed on the side of the light source 21 with respect to the lens LE placed on the nosepiece 4 (the aperture 4a). In addition, a plurality of the light sources 21 may be disposed two-dimensionally for obtaining a measurement light bundle similar to the measurement light bundle having transmitted through the target plate 23.

The control unit 40 is connected with a memory 41 for storing the measurement results and a displaying circuit 42 for displaying information about the measurement including the measurement results on the display 2.

The operation of the lens meter of the present invention having an above-described structure will be described below. First, a description will be given to the measurement of a progressive lens in a frame. It should be noted that the directions referred to as up-and-down, right-and-left, and horizontal directions in this specification means those under a condition of wearing spectacles.

Figure 4A:
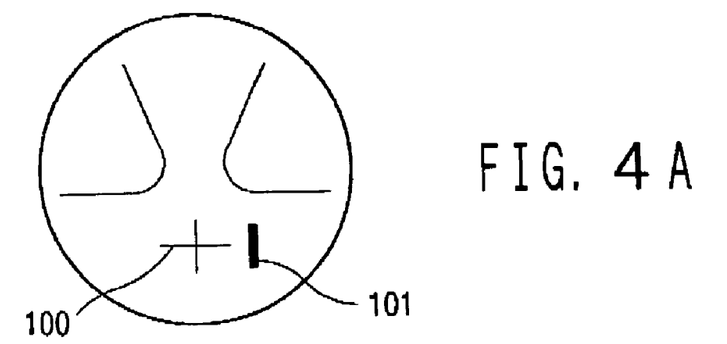
FIGS. 4A to 4C are views showing displays for alignment of a far viewing section.

One of the switches 3, corresponding to the display on the display 2, is pressed to enter a progressive-lens measurement mode, then the vicinity of the far viewing section of the lens LE is placed on the nosepiece 4 (the aperture 4a). As shown in FIG. 4, an alignment screen with a circle simulating the progressive lens is displayed on the display 2, and a central guide mark 100 and a target mark 101 for the alignment of the far viewing section appear therein. The alignment of the far viewing section is performed while an operator is looking at the display 2. At this time, as shown in FIG. 1, the bottom ends of the right and left lenses (or the right and left lens frames) are simultaneously brought into contact with the contact surface 6a of the lens table 6. Further, the lens holder 5 is lowered, and the back surface of the lens LE is fully in contact with the rim of the aperture 4a, so that the direction of the normal to the back surface of the lens LE may coincide approximately with the optical axis L1, (which is preferred).

The alignment of the far viewing section will be described below. When the lens does not have an astigmatic refractive power, the far viewing section of the progressive lens is situated on a vertical axis on which the prism in the right-and-left direction of the lens is zero (an up-and-down direction under a condition of wearing spectacles is considered to be a vertical direction). The amount of prism in a horizontal direction on the vertical axis is approximately zero. Accordingly, the control unit 40 calculates the amount of prism based on the image of the hole H5 or the images of the group of the holes H1, H2, H3 and H4 shown in FIG. 3, and judges whether the present measuring position is near the far viewing section. If the amount of horizontal prism is still large and the far viewing section is judged not to be located within the aperture 4a, the target mark 101 is displayed in the right or left with respect to the central guide mark 100 (see FIG. 4A), so that the operator moves the lens LE toward the right or left to bring the amount of horizontal prism near to zero. The position in which the target mark 101 is displayed is controlled based on the amount of horizontal prism. When the amount of horizontal prism becomes approximately zero, the target mark 101 is displayed so as to coincide with the vertical line of the central guide mark 100.

After the amount of horizontal prism becomes approximately zero, the control unit 40 calculates a refractive power at each of the measuring positions based on the groups of the holes H1 to H4, the holes H1, H2, H6 and H7, and the holes H3, H4, H12 and H13. In the vicinity of the far viewing section, the refractive power is approximately constant if the measuring position shifts within a region nearly as small as the diameter of the aperture 4a. Accordingly, if the refractive powers at the three measuring positions are approximately the same, the measuring positions in the up-and-down direction are judged to be in the far viewing section or in the region almost the same as the far viewing section. When the equivalent spherical value obtained based on the group of the holes H3, H4, H12 and H13 is greater than that of the holes H1, H2, H6 and H7, the present measuring positions are judged to be in the progressive section. In this case, an arrow mark 102 (see FIG. 4B) is displayed as an instruction to put the lens LE toward a deep side of the lens meter (move the lens LE rearward). When the refractive powers at the three measuring positions are judged to be approximately the same, the control unit 40 changes the display form of the target mark 101 into a big cross mark 105 (see FIG. 4C) to indicate the completion of the alignment of the far viewing section. At this time, the operator pushes the switch 8 to store the measured value of the far viewing section in the memory 41. Alternatively, the control unit 40 may store the measured value into the memory 41 automatically.

When the lens LE has an astigmatic power, the amount of horizontal prism of the far viewing section does not become zero, and a correction should be made. In the case of the astigmatic power being more than the spherical power, an error of the amount of correction could be greater. On this account, the astigmatic powers obtained based on the groups of the holes H1 to H4, the holes H2, H4, H9 and H10, and the holes H1, H3, H15 and H16 are calculated, and the target mark 101 is displayed on the display 2 to move the lens LE so that the astigmatic power obtained based on the group of the holes H1 to H4 may be the smallest of those of the other groups.

When a mark is to be made to record the position of the far viewing section, the position where the amount of horizontal prism is approximately zero, or the position where the astigmatic power reaches its minimum in the case of the lens LE having an astigmatic power, is aligned with the measuring position based on the group of the holes H1 to H4 in the approximate center of the aperture 4a. However, when it is intended to obtain an approximate value of the refractive power of the far viewing section, the alignment need not be performed so precisely. That is to say, for the alignment in the right-and-left direction, not only the group of the nearly central holes H1 to H4, but also the groups of (the other) neighboring holes may be used as long as the amount of horizontal prism is approximately zero at the position aligned with those groups of the neighboring holes. For the alignment in the vertical direction, the alignment maybe considered to have been done sufficiently as long as the equivalent spherical value of any one of the measuring positions in the vertical direction is approximately the same as that of another measuring position. In other words, it is good enough that the far viewing section falls within the measurement area (region) formed by the holes H1 to H17. That is, it is not necessarily required to align the optimum measuring point of the far viewing section with the center of the aperture 4a, thereby facilitating the alignment. In this case, the refractive power obtained at the position where the amount of horizontal prism, the astigmatic power, and the equivalent spherical value become the smallest is considered as the measured value of the far viewing section.

Figure 4B:
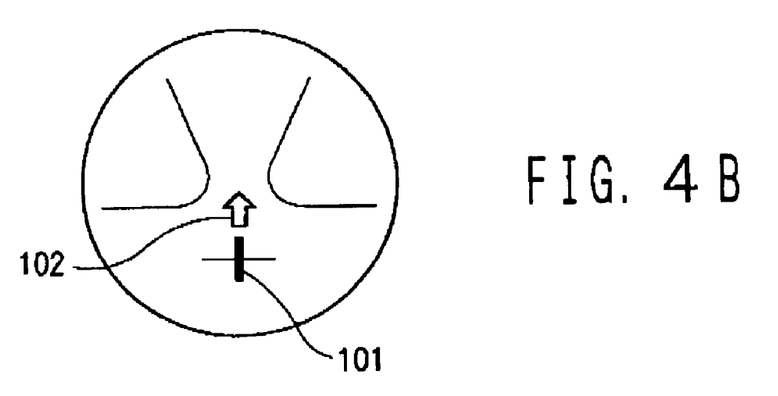
Figure 4C:
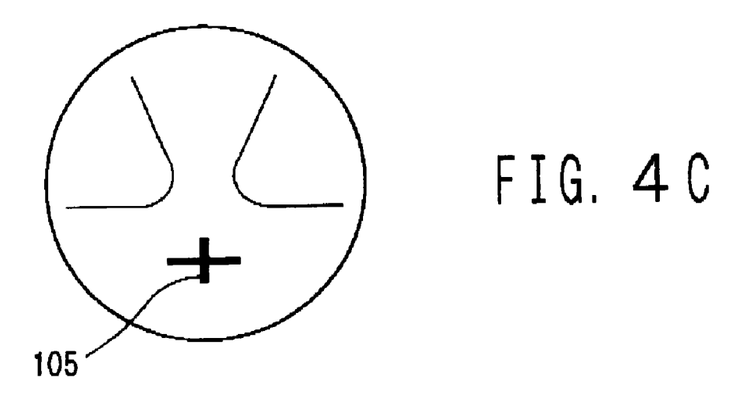

In addition, regarding the display for alignment, the target mark 101 shown in FIG. 4A and the arrow mark 102 shown in FIG. 4B may be displayed simultaneously (before the target mark 101 coincides with the vertical axis of the central guide mark 100.) When it is intended to obtain an approximate value of the refractive power of the far viewing section, once the intended refractive power has been obtained, the display form of the target mark 101 may be changed to indicate it to the operator. The operator may, in advance, select using the switch 3 whether he intends to make a mark, or to obtain the approximate refractive power of the far viewing section.

Figures 5A, 5B:
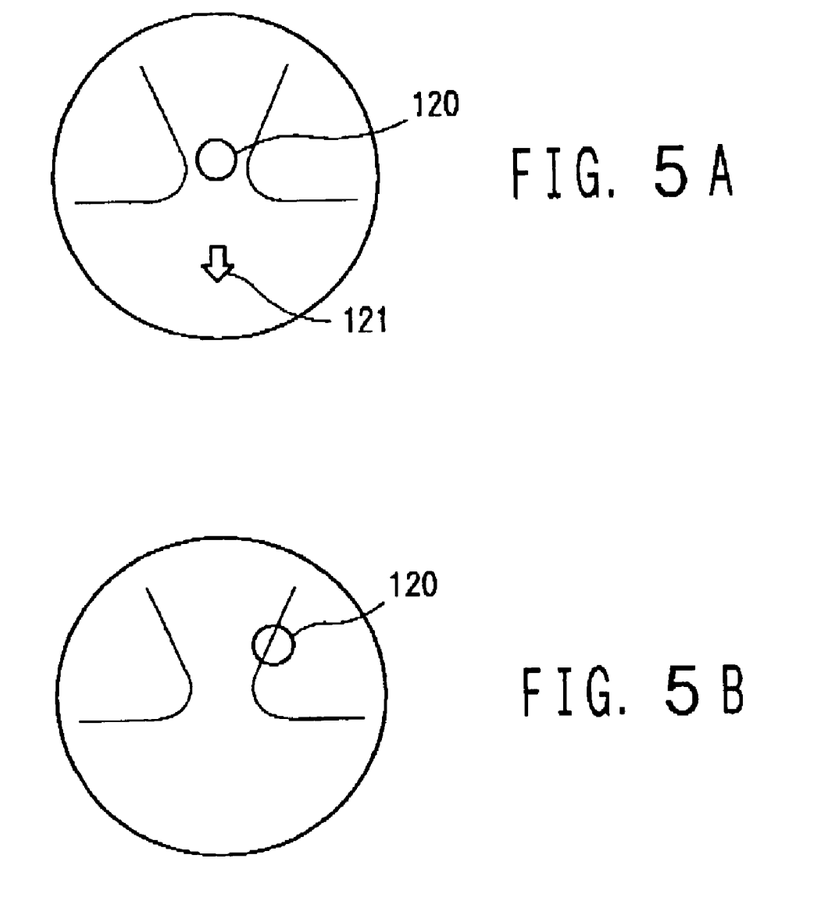
FIGS. 5A to 5C are views showing displays for alignment of a near viewing section.
Figure 5C:
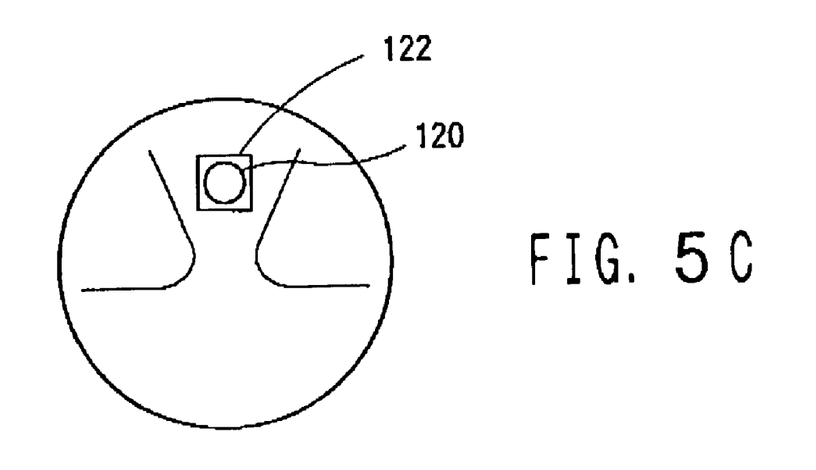

The measurement of the near viewing section will be described below. FIGS. 5A to 5C show the displays for alignment of the near viewing section. Once the measured value of the far viewing section has been stored in the memory 41, the lens meter enters the step of measuring the near viewing section. In the alignment screen on the display 2, an arrow mark 121 appears as an instruction to pull the lens LE toward the front side of the lens meter (move the lens LE frontward). Once the far viewing section has gone out of the measurement area as the lens LE is moved, and the progressive section has been judged to be located in the measurement area, then an annular target mark 120 appears on the display 2 (see FIG. 5A) Further, the annular target mark 120 is also moved in accordance with the movement of the lens LE. The movement of the annular target mark 120 is performed based on a value calculated by converting a change of the amount of prism or a change of the additional power in the up-and-down direction on the lens LE into a movement amount. Meanwhile, the control unit 40 makes measurements consecutively.

In the vicinity of the near viewing section, the refractive power may be assumed to be approximately constant inside the aperture 4a. For example, the control unit 40 obtains the refractive power at each of the measuring positions based on the groups of the holes H1 to H4, the holes H1, H2, H6 and H7, and the holes H3, H4, H12 and H13. If the equivalent spherical values vary widely among those measuring positions, the control unit 40 judges that the measuring position is still in the progressive section. If the equivalent spherical values of those measuring positions are almost the same, or if the group of the holes H1 to H4 has the largest value, the measuring position in the up-and-down direction is judged to be in the near viewing section.

As for the right-and-left direction, an absolute value of the difference between the astigmatic power of the far viewing section previously measured and that being presently measured is defined as an amount of optical distortion. The amount of optical distortion is obtained for each of the measuring positions based on the groups of the holes H1 to H4, the holes H2, H4, H9 and H10, and the holes H1, H3, H15 and H16. If the amount of optical distortion obtained based on the group of the holes H1 to H4 is the smallest of those of the other groups, the measuring position in the right-and-left direction is judged to be also in the near viewing section. If the amount of optical distortion obtained based on the group of the holes H1, H3, H15 and H16 is the smallest, the annular target mark 120 is displayed at a position deviated to the right side from the center to instruct the operator to move the lens LE leftward (see FIG. 5B).

If the measuring positions in the up-and-down direction and in the right-and-left direction are both in the near viewing section, a square mark 122 appears around the annular target mark 120 to inform the operator that the near viewing section has been found (see FIG. 5C). Here, the equivalent spherical value of the far measuring point, which has been previously obtained, is subtracted from that of the near measuring point obtained based on the holes H1 to H4. This value is then displayed as the additional power on the display 2. The measured value of the near viewing section is stored in the memory 41 by the operator with the push of the switch 8 (or by the control unit 40 automatically.)

In the above description, the near viewing section is aligned with the measuring position based on the group of the nearly central holes H1 to H4. However, in a case where it is intended to obtain an approximate value of the refractive power to know the additional power (which is a typical case), it is good enough that the equivalent spherical values in the up-and-down direction are almost the same and that the position where the amount of optical distortion is approximately zero falls within the measurement area formed by the holes H1 to H17. In this case, the refractive power of the position meeting those criteria is obtained to indicate the additional power on the display 2.

In the measurement of the progressive lens using the conventional lens meter, the lens should be moved to shift the measuring point from the far viewing section to the near viewing section through the progressive section. On the other hand, in the present lens meter, the measuring point may be guided to the correct position of the near viewing section based on the refractive powers at plural measuring positions. The measuring point may therefore be moved from the far viewing section directly to the vicinity of the near viewing section so that both the two sections may be measured smoothly. In other words, if the difference between the equivalent spherical values in the up-and-down direction is large, the lens LE may be moved downward, and maybe further moved in a direction where the amount of optical distortion in the right-and-left direction is smaller. If the amount of optical distortion at the center is the smallest, the measuring point is judged to be in the middle of the progressive section. In accordance with this judgment, the control unit 40 controls the display of the annular target mark 120, the arrow mark 121 and the like. Even in the case where the measuring point is moved along the progressive section, the position of the near viewing section may be determined and the measuring point may be shifted into the near viewing section smoothly in the above-described manner.

In the foregoing description, the measurement mode is shifted to the progressive lens measurement mode by operating the switch 3. However, if it is unknown whether the lens LE is a single focal lens or a progressive lens, it maybe automatically judged from the differences among the refractive powers at the nine measuring positions. In other words, the vicinity of the geometric or optical center of the lens LE is measured, and if the refractive power is almost invariant at the nine positions, the lens LE may be judged as a single focal lens. If the equivalent spherical values or the astigmatic powers vary greatly among those positions, the lens may be considered as a progressive lens. Typically, the vicinity of the geometric or optical center of a progressive lens is in its progressive section, the refractive powers vary greatly with change in position, even if the positional change is slight. When the lens meter operates in the single focal lens measurement mode, and if the lens LE is judged as a progressive lens after the measurement is commenced, the control unit 40 may bring the judgment result onto the display 2 to inform the operator of it, so that the lens meter is sent into the progressive lens measurement mode.

Next, a description will be given to the features of the present lens meter in the measurement of a single focal lens. For measuring a single focal lens, optical characteristics obtained based on the group of the holes H1 to H4 are utilized to align the optical center of the lens LE with the optical axis L1, but the results from another group of the holes may also be used.

An aspherical single focal lens has the curvature of a lens curve and the amount of aberration both of which vary with distance from the optical center. In a lens meter merely capturing information about the position where a group of measurement light bundles having its center on the optical axis L1 passes through, there may be a great error in a measured value, or even a slight shift of the position may change a measured value greatly. In the present lens meter, however, the measured value may be determined by obtaining the refractive powers at eight measuring positions which are located around the measuring position based on the holes H1 to H4, and then averaging those refractive powers. The average refractive power of the particular region may be thus obtained simulatively. This makes it possible to obtain a measured value approximate to a value which can be obtained using a manual lens meter.

For obtaining the average value, the refractive powers obtained at the nine measuring positions may be simply averaged, or they may be averaged after multiplied by a factor obtained by assigning weights to some extent to a measured value of the central measuring position. Alternatively, the patterns of obtaining refractive powers may be increased by adding new groups of holes such as the holes H1, H9, H11 and H13, the holes H2, H12, H14 and H16, the holes H4, H7, H15 and H17, and the holes H3, H6, H8 and H10, as well as the holes H8, H11, H14 and H17, and the refractive powers at these measuring positions based on the additional groups of the holes may be included in the averaging.

Further, whether the lens is aspherical or not may be judged based on the difference between the refractive power obtained based on the group of the holes H1 to H4 and each of the refractive powers obtained at the eight surrounding measuring positions. The control unit 40 obtains optical characteristics at each measuring position, and when it judges that the lens is aspherical, it brings the judgment result onto the display 2.

Furthermore, a single focal lens may also be measured in the following manner. If there is any dirt, dust, scratch and the like inside the measurement optical system or on the lens, the refractive power at the central measuring position (based on the holes H1 to H4) might not be measured, or it could differ greatly from those at the surrounding measuring positions. In this case, the refractive power at any group of the peripheral holes (e.g. the holes H8, H11, H14 and H17, or any other combination) may be considered as a measurement. Since the groups of the peripheral holes also allow prism measurement, the optical center of the lens may be guided onto the optical axis L1, and there is no problem in making a mark.

Up to this point, descriptions have been given to the measurement optical system, as an embodiment of the present invention, in which a grid target plate having a multitude of holes is placed in the measurement optical path. However, the present invention may also be applied to an optical system having the following structure. For example, Japanese Patent Application Unexamined Publication No. Hei 09-43099 (U.S. Pat. No. 5,682,234) discloses a measurement optical system in which plural groups of at least three light sources for measurement are disposed, and each group is controlled to light up in sequence, thereby allowing a plurality of measuring positions to be formed inside the aperture 4a using merely one measurement target. Also, in a measurement optical system employing retinoscopy as a basic principle and having a photodetector disposed at a position conjugate with a lens, in which a rotating body having two or more kinds of slits inclined at different angles is disposed on an optical path, a plurality of measuring positions may be formed inside the aperture 4a as well by providing photo-receiving points in multiple groups of at least three.

As described above, according to the present invention, a progressive lens may be measured easily, and an aspherical lens may also be measured accurately.

The foregoing description of the preferred embodiments of the invention has been presented for purposes of illustration and description. It is not intended to be exhaustive or to limit the invention to the precise form disclosed, and modifications and variations are possible in the light of the above teachings or may be acquired from practice of the invention. The embodiments chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A lens meter for measuring optical characteristics of a lens comprising:

a lens rest having an aperture of a predetermined diameter, for supporting a lens to be measured at a predetermined position thereon;

a measurement optical system having a light source which projects a measurement light bundle onto the lens supported on the lens rest, an optical member which forms the measurement light bundle to be projected onto the lens into a parallel light bundle, a target plate which limits the measurement light bundle having passed through the lens and the aperture and on which numerous measurement targets are disposed, and a two-dimensional image-sensor which detects the measurement light bundle having passed through the target plate;

a controller that:

obtains a refractive power distribution within a region to be measured of the lens based on a detection result by the image-sensor, the measurement light bundle having passed through the region being capable of passing through the aperture, and judges whether a near viewing section of the lens is within the region based on the obtained refractive power distribution; and a display that displays, based on the obtained refractive power distribution, a first indicator which indicates a movement direction of the lens on the lens rest so that the near viewing section falls within the region, and a second indicator which informs an operator that the near viewing section falls within the region.

2. The lens meter according to claim 1, wherein the measurement targets include a central target corresponding to a center of the aperture and a plurality of targets disposed around the central target at a predetermined interval.

3. A lens meter for measuring optical characteristics of a lens comprising:

a lens rest having an aperture of a predetermined diameter, for supporting a lens to be measured at a predetermined position thereon;

a measurement optical system having a light source which radiates a measurement light bundle, an optical member which forms the measurement light bundle into a parallel light bundle, a target plate which has numerous measurement targets, and a two-dimensional image-sensor which detects images of the measurement targets formed by the measurement light bundle passing through the lens, the aperture and the target plate a controller that:

obtains a refractive power distribution based on a detection result of the measurement target images by the image-sensor, and judges whether a near viewing section of the lens is within a region to be measured of the lens based on the obtained refractive power distribution; and a display that displays, based on the obtained refractive power distribution, a first indicator which indicates a movement direction of the lens on the lens rest so that the near viewing section falls within the region when the near viewing section is not within the region, and a second indicator which informs an operator that the near viewing section falls within the region when the near viewing section is within the region.

* * * * *